(12) United States Patent
Zhu

(10) Patent No.: US 11,769,402 B2
(45) Date of Patent: Sep. 26, 2023

(54) AUGMENTING MOBILE DEVICE OPERATION WITH INTELLIGENT EXTERNAL SENSORS

(71) Applicant: Intel Corporation, Santa Clara, CA (US)

(72) Inventor: Lejun Zhu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 376 days.

(21) Appl. No.: 16/954,481

(22) PCT Filed: Mar. 29, 2018

(86) PCT No.: PCT/CN2018/081024
§ 371 (c)(1),
(2) Date: Jun. 16, 2020

(87) PCT Pub. No.: WO2019/183869
PCT Pub. Date: Oct. 3, 2019

(65) Prior Publication Data
US 2021/0078571 A1 Mar. 18, 2021

(51) Int. Cl.
*G08G 1/04* (2006.01)
*H04W 4/48* (2018.01)
(Continued)

(52) U.S. Cl.
CPC ............... *G08G 1/04* (2013.01); *B60W 30/09* (2013.01); *B60W 30/0956* (2013.01);
(Continued)

(58) Field of Classification Search
None
See application file for complete search history.

(56) References Cited

U.S. PATENT DOCUMENTS

2017/0215046 A1* 7/2017 Moebus ............... H04W 4/02
2017/0221366 A1   8/2017 An et al.
(Continued)

FOREIGN PATENT DOCUMENTS

CN   102303605 A   1/2012
CN   103853155 A   6/2014
(Continued)

OTHER PUBLICATIONS

International Search Report and Written Opinion dated Dec. 29, 2018 for International Patent Application No. PCT/CN2018/081024, 9 pages.

*Primary Examiner* — Adam D Tissot
*Assistant Examiner* — Garrett F Evans
(74) *Attorney, Agent, or Firm* — Schwabe, Williamson & Wyatt, P.C.

(57) ABSTRACT

In embodiments, sensors from an environment in which a mobile device is moving may be used to provide extra input to allow for improved risk analysis and detection in the environment. To prevent unwanted surveillance, proximity to the environment's sensors may be required. It will be appreciated a coordinator in the environment may assist with handling multiple sensor data provided to the mobile device, and may also assist with identifying risk. The environment may also act as a data feed allowing the mobile device to simply receive additional sensor data and perform its analysis and operation.

24 Claims, 6 Drawing Sheets

(51) Int. Cl.
*B60W 60/00* (2020.01)
*H04W 12/63* (2021.01)
*H04W 12/03* (2021.01)
*B60W 30/09* (2012.01)
*B60W 30/095* (2012.01)
*G08G 1/16* (2006.01)
*H04W 4/02* (2018.01)
*G06V 20/58* (2022.01)

(52) U.S. Cl.
CPC ........... *B60W 60/001* (2020.02); *G06V 20/58* (2022.01); *G08G 1/164* (2013.01); *H04W 4/023* (2013.01); *H04W 4/48* (2018.02); *H04W 12/03* (2021.01); *H04W 12/63* (2021.01); *B60W 2420/40* (2013.01); *B60W 2420/52* (2013.01); *B60W 2556/45* (2020.02)

(56) References Cited

U.S. PATENT DOCUMENTS

| | | | |
|---|---|---|---|
| 2018/0040246 A1* | 2/2018 | Yonemura | G08G 1/164 |
| 2018/0096595 A1* | 4/2018 | Janzen | G06V 10/94 |
| 2018/0144623 A1* | 5/2018 | Shirakata | G08G 1/0145 |
| 2019/0114921 A1* | 4/2019 | Cazzoli | G06V 20/58 |

FOREIGN PATENT DOCUMENTS

| | | |
|---|---|---|
| CN | 106740463 A | 5/2017 |
| CN | 106873580 A | 6/2017 |
| CN | 107852763 A | 3/2018 |

\* cited by examiner

AUGMENTING MOBILE DEVICE OPERATION WITH INTELLIGENT EXTERNAL SENSORS

CROSS REFERENCE TO RELATED APPLICATIONS

The present application is a national phase entry under 35 U.S.C. § 371 of International Application No. PCT/CN2018/081024, filed Mar. 29, 2018, entitled "AUGMENTING MOBILE DEVICE OPERATION WITH INTELLIGENT EXTERNAL SENSORS", which designated, among the various States, the United States of America. The Specifications of the PCT/CN2018/081024 Application is hereby incorporated by reference.

TECHNICAL FIELD

The present disclosure relates to autonomous and/or semi-autonomous device movement, and more particularly, to assisting device movement by increasing device awareness of potential safety hazards in or entering its environment and/or proximity.

BACKGROUND AND DESCRIPTION OF RELATED ART

Self-driving cars today rely on radar, LIDAR (Light Detection and Ranging), cameras and other sensors installed in a car to detect its environment and possible dangerous situations. The sensors can often detect issues/danger more precisely and faster than human eyes. Digitized sensor details may be processed by on board computer(s) to establish a model of the car's surroundings. A processing environment, such as an Artificial Intelligence tasked with interpreting the sensor details the car was able to detect and it may then adjust the car's travel to select the best route forward, and operate the car accordingly.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
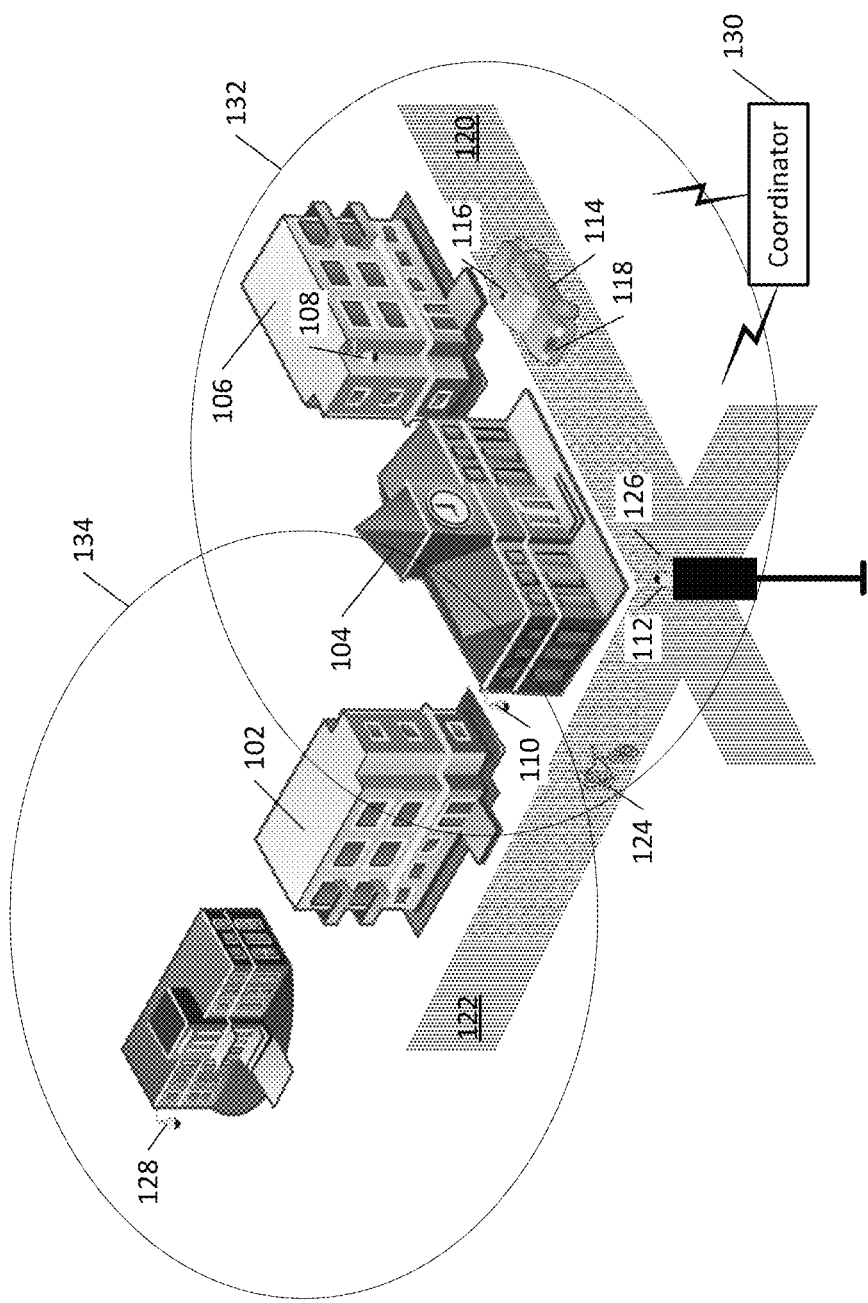
FIG. 1 illustrates an exemplary environment 100.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents. Alternate embodiments of the present disclosure and their equivalents may be devised without parting from the spirit or scope of the present disclosure. It should be noted that like elements disclosed below are indicated by like reference numbers in the drawings.

As noted above a car may detect its environment and an AI may adjust operation of the car based on what is detected. One limitation of this system, however, is that the car is limited to what it can sense. It will be appreciated that a car's line of sight may be obscured, such as by other vehicles, buildings, permanent or temporary structures, weather, obstructions on the car (snow, ice, mud, attachments/equipment/stickers added to the car), electromagnetic (EM) or ultrasonic interference, misaligned bumpers, extreme temperatures, unusual lighting, etc. For example, consider the simple example of a car and a bicycle approaching an intersection from different directions. It is not possible for a LIDAR or a camera to detect the bicycle hidden from view due to being located around the corner of a building. If the bike is traveling from behind the building toward the intersection, the car may not be able to detect the bike until they are about to unexpectedly meet (crash) in the intersection. Further, it will be appreciated that under some circumstances the car may fail to recognize objects in its environment. A well-publicized fatal accident is that of a Tesla car that failed to slow down when a truck pulled across its path and the truck's coloration (white-colored) blended in with the background environment (similarly-colored sky). Although the exact reason for why the car did not recognize the truck was under investigation, these and other such sensory troubles suggest that, if possible, assisting the car or other moving device to understand what's in its environment would represent an important improvement to autonomous and/or semi-autonomous vehicle movement.

For reference, "levels" have been associated with movable devices, such as cars. Level 0 represents no automation. Level 1 provides some driver assistance, such as adaptive cruise control that may adjust steering or speed (but not both simultaneously). Level 2 provides partial automation, such as braking, acceleration, or steering, but the driver is expected to remain in control and respond to traffic, traffic signals, hazards, etc. Level 3 provides conditional automation, where a car may generally control its movement but a driver is expected to be able to take control at any moment. It will be appreciated that while the driver is expected to remain alert, it is likely drivers will not be alert after some time of letting the car be in control. Level 4 provides high automation, so that, for example, in restricted or otherwise well-understood environments (e.g., while on a highway), the car may be entirely self-controlled with no driver involvement. But when on side streets the driver would be required to control the car. Level 5 represents the current pinnacle of autonomous devices where full automation is provided and, for example, a car, may operate on any road in any conditions a human driver could operate. Errors in the image detection or other sensor interpretation mistakes that led to the Tesla crash may cause crashes for any level 3 or higher device.

The following discussion will cover adding other inputs that may be external to a mobile device (e.g., car, bus, motorcycle, bike, plane, drone, balloon, or any device that may direct its movement in some way) to assist the device with having a better model from which to make automation decisions, e.g., to self-direct its movement or take other action. It will be appreciated that while discussion is focusing on mobile devices, the discussion may include devices/mechanisms that may control movement of another device. In one embodiment, existing cameras in the environment are temporarily used to increase the data available to the mobile device. For example, cameras already installed on roadways, in intersections (e.g., on the traffic lights), on buildings, etc. may be used. It will be appreciated cameras are just one example to highlight operation of some of the illustrated and/or disclosed embodiments, but it will be appreciated than any other sensor may be used to assist a mobile device. In the context of the car and bike approaching an intersection, FIG. 1 discusses using building and/or intersection camera(s) to assist with identifying potential unwanted interaction between a mobile device such as a car, and the bicycle.

It will be appreciated there are many different techniques that may be employed for object and other data recognition in input data, such as visual input data. See for example, Practical object recognition in autonomous driving and beyond; Teichman & Thrun; Advanced Robotics and its Social Impacts (2011) pgs. 35-38 (DOI: 10.1109/ARSO.2011.6301978). Or Object recognition and detection with deep learning for autonomous driving applications; Uçar, Demir, & Güzelis, (Jun. 2, 2017) accessible at Internet uniform resource locator (URL) doi.org/10.1177/0037549717709932. Or Towards Fully Autonomous Driving: Systems and Algorithms; Levinson, Askeland, et. al., accessible at URL www.cs.cmu.edu/~zkolter/pubs/levinson-iv2011.pdf. Through used of these and other recognition systems, a mobile device, such as a car, in conjunction with external perspectives provided by the exemplary cameras or other sensors, may cooperatively, either working together, or one device providing data to another (e.g., an intersection camera may provide data to a car to assist its detecting issues), to assist with movement of the mobile device.

Various operations may be described as multiple discrete actions or operations in turn, in a manner that is most helpful in understanding the claimed subject matter. However, the order of description should not be construed as to imply that these operations are necessarily order dependent. In particular, these operations do not have to be performed in the order of presentation. Operations described may be performed in a different order than the described embodiment. Various additional operations may be performed and/or described operations may be omitted in additional embodiments. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are considered synonymous.

As used herein, the term "circuitry" or "circuit" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, processor, microprocessor, programmable gate array (PGA), field programmable gate array (FPGA), digital signal processor (DSP) and/or other suitable components that provide the described functionality. Note while this disclosure may refer to a processor in the singular, this is for expository convenience only, and one skilled in the art will appreciate multiple processors, processors with multiple cores, virtual processors, etc., may be employed to perform the disclosed embodiments.

FIG. 1 illustrates an exemplary environment 100. As illustrated there are structures 102-106 that may contain sensors 108-112 such as cameras as illustrated, though it will be appreciated they may be these and/or combination of other types of sensors, such as proximity detectors, motion detectors, short or long range identification systems (e.g., RFID readers, facial detectors, object recognizers/detectors, pattern detectors, license plate or other marker/ID readers, magnetic or other signal recognizers, etc. In the illustrated embodiment, let's assume use of cameras to monitor areas.

In the illustrated embodiment, one or more sensors 108-112 are used to assist with detecting potentially dangerous situations, such as an obstacle that might not be detectable from one perspective but that may be identifiable through use of other sensors, or other dangerous situation. It will be appreciated dangerous situations may be caused by software errors of an artificial intelligence (AI) operating a mobile device, such as a transportation device such as a car, errors introduced by human drivers, device failure such as flat tires or other mechanical failure, or simply a limited field of vision. For example, an autonomous (e.g., level 4 or 5) or semi-autonomous (e.g., level 3) vehicle, such as the illustrated car 114 is expected to have a variety of sensors 116, 118, that are used to identify the car's local environment and provide data required for the device to navigate, e.g., on a road 120. In the illustrated embodiment it will be appreciated that the vehicles sensors 116, 118 have a field of view limited by the environment. As illustrated, buildings 104, 106 are blocking the view of activity of a cross street 122. If the vehicle 114 is autonomously navigating down the road 120, and a cyclist 124 is riding down the cross street 122, it is possible the vehicle and cyclist (or other obstruction that may be undetectable) may unexpectedly meet at the intersection 126 because the vehicle's field of view was obstructed by the buildings 104, 106.

In the illustrated embodiment, other vantage points 108-112, external to the vehicle, may be used to augment the limited visibility available to the vehicle. In one embodiment, a recognition system, employing video analytic algorithms and domain specific rules, may be used to analyze an environment, including identifying types of objects in the vicinity of the sensor, object movement, speed, trajectory, scene classification, content analysis, movement prediction, etc., and in the case of vehicles, domain specific analysis such as lane detection, speed detection, navigation violations, erratic behavior, etc. and use this analysis to identify activity on the streets 120, 122. Based on the analysis, potentially dangerous situations, such as an imminent potential collision, may be predicted.

It will be appreciated the recognition system may be embodied in a variety of locations. For example, a smart city might a comprehensive sensor network including cameras, radar, LIDAR, sonar, air quality detectors, leak detectors, etc. and it may use these sensors to monitor activity in the city such as movement of the vehicle 114 and cyclist 124 and determine that a collision is likely at the intersection 126 and this information may be sent to the vehicle so that its autonomous driving AI may respond to the potential threat, e.g., by breaking, swerving, stopping, etc. and/or this information may be provided to a human driver in the vehicle so that the driver may respond. In another embodiment, external sensors, such as cameras 108-112 may collect information from their environment (e.g., anything within a sensor's perceptible input area), and apply the recognition system to identify what is in the input area and provide this information to a device such as the vehicle. In this embodiment, the vehicle interprets received data to identify a threat, obstacle, or the like that should be avoided.

In the illustrated embodiment, it will be appreciated that while the vehicle 114 is traveling on street 120, a cyclist 124 on the cross street 122 may be rushing toward the intersection 126 and be undetectable by the vehicle's sensors 116, 118. The sensors 110, 112 on the cross-street 122, however, are able to detect the cyclist. Based on the apparent trajectories of these two objects, a collision threat assessment may be made and the vehicle appropriately notified of the potentially dangerous situation. As discussed the determination of the threat may be made in a recognition system that may be in the vehicle, external to the vehicle such as maintained by the coordinator 130 or other entity, or as a combination of vehicle-based analysis in combination with external input. In one embodiment, external camera 108-112 video feeds and associated content analysis are provided to the vehicle for use by the vehicle as if these sensors were part of the vehicle's input systems for it use in performing its navigation operation.

In one embodiment, in order to protect privacy, a security system is used to prevent an entity from, for example, simply continuously receiving all video feeds and surveilling an environment without authorization to do so. In one embodiment, only vehicles that are proximate to areas of potentially dangerous situations are provided the data from the sensors 108-112. Thus, for example, since the vehicle 114 is approaching the intersection 126, it may have access to the sensors 108-112 to assist with threat detection and avoidance. However, because the vehicle is not in proximity to a distant sensor 128, data that is being generated by this sensor would not be provided to the vehicle. It will be appreciated a variety of different techniques may be employed to determine what data the vehicle is entitled to receive. One such technique is physical proximity, where if a device is nearby it may be granted access to the data. In another embodiment, a device may register with a system, such as a smart city, and be provided data relevant, for example, to a route currently being implemented by the vehicle. Assuming the location of the vehicle is known, by way of positioning information, e.g., by way of a global positioning system (GPS), or other location technique, then data for areas proximate to the vehicle may be provided. However it will be appreciated, particularly in a known route context, more remote data, or systemic data regarding road trouble, closures, traffic, pedestrians, and the like may be provided to allow the vehicle to optimize its route to avoid as many obstacles as possible.

In another embodiment, sensors may provide their data to devices, such as the vehicle 114, when the device becomes detectable by a sensor (e.g., visible to a camera), and continue to provide data for as long as the vehicle is visible (until perhaps a timeout) and for some time after it leaves the area. In such fashion, sensor 108 may start providing data when it detects the vehicle and sensor 112 may provide data since the vehicle is approaching the intersection 126, and sensor 110 may provide its data because it is able to detect beyond the vehicle's restricted field of view and assist with identifying potentially dangerous situations such as a collision between the vehicle and the cyclist 124. Although the security system may be configured to only provide data from a sensor that is able to detect the vehicle, it will be appreciated that some sensors, such as sensor 110 may be part of a group defined for example around the intersection 126 so that data is shared from sensors on both streets 120, 122 with devices that are proximate to the intersection or otherwise receiving data from members of the group.

It will be appreciated detectability depends on the sensor. If the sensor is a camera, detection may mean reading a marking on a device to distinguish one device from another. For example, if the device is a vehicle then the marking may be the license plate for the vehicle. The marker may serve as a lookup ID to allow determining, if using a registration system, a vehicle is authorized to receive data. If privacy is a concern (and it should be) the security system may be configured to use anonymizers to prevent unwanted tracking of mobile devices such as vehicle 114. If proximity to the sensor (or a sensor in a group) is a requirement for sharing sensor data, other techniques may be used to confirm proximity. For example, a short-range beacon, such as Bluetooth, Wi-Fi or other limited distance transmitter may be used to associate a device with a sensor and/or sensor group. Once a device is out of range of the sensor beacon then sharing may stop. It will be appreciated that a timeout may be used to allow continued sharing for a time to allow for vehicles that for some reason become undetectable.

Based on the data that a vehicle 114 is able to receive from its sensors 116, 118, and from other sensors 108-112, a recognition system (either in the vehicle, external to the vehicle, some combination of the two, or other implementation) may detect obstacles or other potentially dangerous situations and provide or otherwise share an identification of the obstacle or potentially dangerous situation with the vehicle. It will be appreciated that a communication service may be used to communicate with the vehicle, and the service may be point to point, and/or routed through a centralized coordinator, such as a coordinator 130, to coordinate data exchanges between sensors and devices, such as vehicle 114. The coordinator may be one or more servers or other machines that may independently and/or cooperatively operate to maintain a flow of information to devices such as vehicle 114 from various sensors 108-112, 128.

As discussed above, the coordinator 130 and/or the sensors 108-112, 128 may employ analysis to assist with detecting potentially dangerous situations, such as obstacles in the road or object movement that might represent risk of collision, such as the cyclist 124. It will be appreciated the location of the illustrated coordinator is for exemplary purposes and the one or more machines represented by the coordinator may be located elsewhere, and in one embodiment, placement may be made at least in part based on the communication technology employed. In one embodiment, the sensors may send messages on a low latency channel, such as a message service transported over a cellular (e.g., 3G, 5G, etc.) network. As discussed above, sensors may be grouped based on a variety of characteristics, such as proximity to each other, proximity to an important location, e.g., an intersection 126, etc. A sensor may be part of multiple groups. Thus, for example, a first group 132 might include intersection related sensors 108-112, while a second group 134 might contain sensors 110, 128 as relating to a section of the cross-street 122. As discussed above a security system may restrict access to data, so the vehicle 114 may receive data from any sensor 108-112 in the first group while traveling on the street 120 toward the intersection 126, but only receive data from all sensors in the second group 110, 128 if the vehicle turns to travel on the cross-street 122 after the intersection.

As noted previously, permission to receive data may be for a limited time, requiring a device such as vehicle 114 to reacquire authorization to receive data. In one embodiment this may be the vehicle being detected again by a sensor in the group, or by another authentication technique. It will be appreciated cryptosystems may be employed to encrypt communication between sensors 108-112, 128, the coordinator 130, the vehicle 114, and/or other entities. A public key cryptosystem may be employed where various entities have public and private keys, and these keys may be shared to enable private communication between the various entities. The sensors may also employ a cryptosystem providing for rolling, changing, expiring, etc. type of keys to enforce the limited access/authentication security requirement. When a device receives a key that later expires, it will need to contact a sensor 108-112, 128, the coordinator 130, or other entity managing secured communication of the sensor data. In one embodiment, security credential provisioning may employ the Intel® Secure Device Onboard technology (see, e.g., Internet URL www.intel.com/content/www/us/en/internet-of-things/secure-device-onboard.html), or other such technology.

Figure 2:
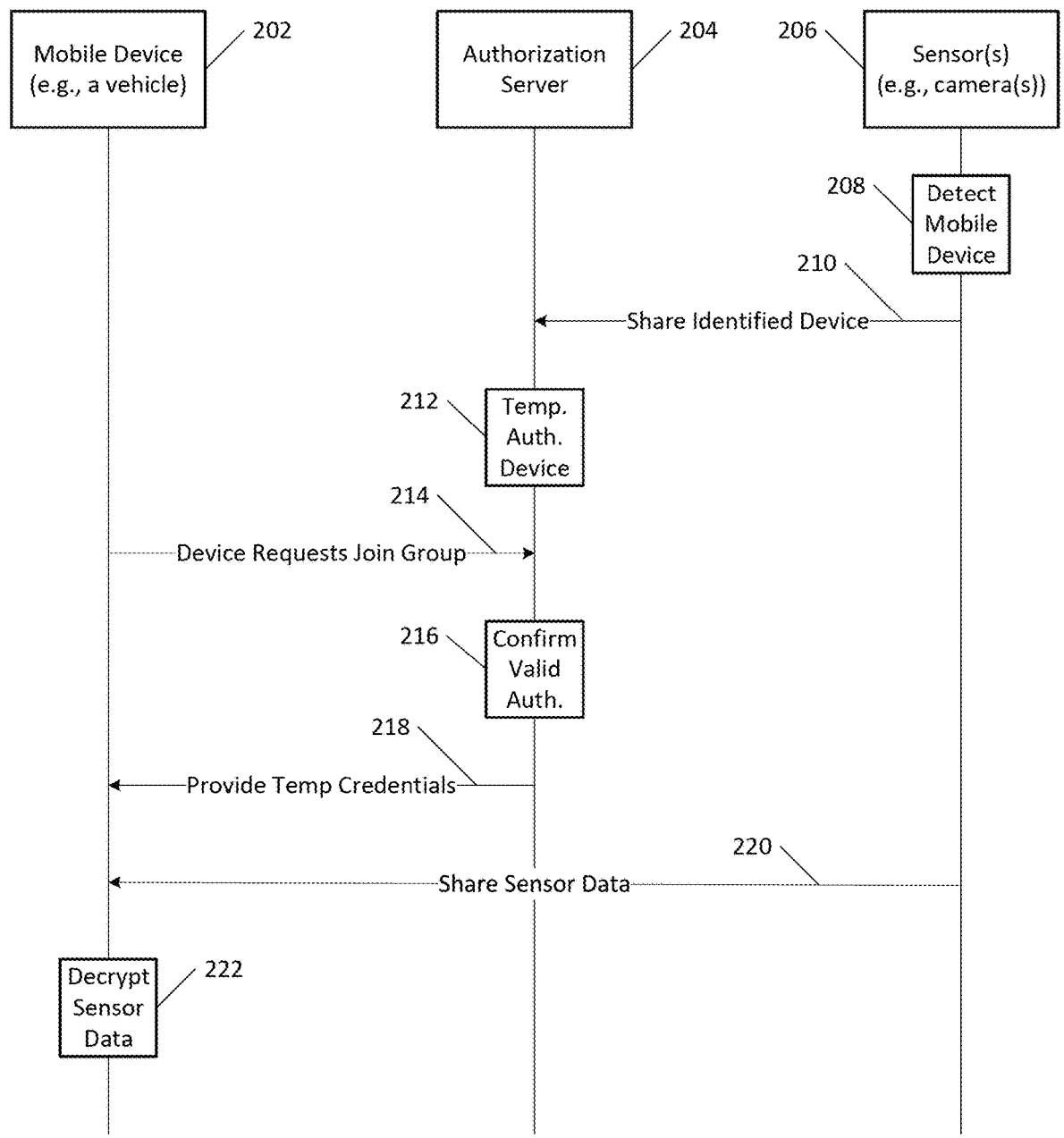
FIG. 2 illustrates an exemplary sequence diagram 200.

FIG. 2 illustrates an exemplary sequence diagram 200. Illustrated are exemplary device 202 which may be some type of mobile device, such as the FIG. 1 vehicle 114; an authorization server 204 which may embody, be embodied in or otherwise communicatively coupled with other machines such as FIG. 1 coordinator 130; and a sensor 206 (or sensors), which may be any device able to detect information about an environment, such as the FIG. 1 cameras 108-112, 128. As discussed above, various security and/or cryptographic technologies, contexts, policies, etc. may be employed to restrict access to data to prevent unwanted and/or illicit surveillance. In the illustrated embodiment, the mobile device is expected to be temporarily in an area and therefore it only should be granted temporary access to sensor data.

In one embodiment, in order to join a sensor group such a FIG. 1 group 132, the mobile device needs to prove it is proximate to at least one sensor in the group. In the illustrated embodiment, a sensor detects 208 the mobile device 202, which for example, could be a camera reading a license plate and distinctly identifying the device, by a registration communication over a short-range communication technology (shows proximity), or other technique. Once identified the information about the device may be shared 210 with an authorization server 204 or other machine, which may then temporarily authorize 212 the mobile device. In one embodiment, the authorization server stores a record of [sensor ID, group ID, mobile device ID], e.g., the ID for a camera that detected a vehicle, the sensor group or groups for the camera, and the license plate detected on the vehicle.

In one embodiment, the record is stored in a time-based cache, where records expire after a predetermined number of minutes after which the mobile device will need to re-authenticate to the group. It will be appreciated the length of the timeout may vary on a variety of factors, including the type of vehicle detected, the speed at which it is traveling, traffic, weather, or other conditions affecting the environment, etc. An encryption key for the group may be used that has a remaining time to live that is longer than the timeout, so that it would allow for a key that changes regularly, for example, daily or weekly, but even with the key the system would ignore communication from the device after expiration of the timeout unless the device can re-authenticate with the group to prove physical proximity. In another embodiment, sensor data is encrypted with an expiring encryption key that changes periodically and the mobile device 202 will be able to retrieve a limited number, e.g., one or more, of keys with the temporary credential; see also operation 218 discussed below. It will be appreciated there are many different cryptosystems, e.g., public key cryptosystems (PKS or PKCS), public key infrastructure (PKI), and private cryptographic systems, that may be used to allow the mobile device temporary secure access to sensor data. In yet another embodiment a combination of both expiring keys and timeouts may be employed.

In a security system, in addition to or instead of authentication based on an identifier physically present on the mobile device, such as a license plate in the case of a vehicle, the mobile device 202 may authenticate itself to a group or other environment with data associated with the device, which may be an identifier registered and associated with the device. It will be appreciated a registry (not illustrated) may be used to anonymously, or openly, register devices so that they may be known and more easily authenticated with different groups or environments. Even if openly registered, for privacy or other considerations, an authorization server 204 does not need to track/log a device joining a group when the purpose is to engage in temporary secure communication with a device passing through an area.

If the mobile device requests 214 to join the group, e.g., with a request to a sensor 206 and/or authorization server 204, the authorization server may confirm 216 the mobile device has a valid authorization to access sensor 206 data. For example, the authorization server may look in its cache or database for a previously recorded 212 temporary authorization. If a previous authorization for the mobile device is located, the authorization server may provide 218 temporary credentials to the mobile device to allow it to access sensor data. It will be appreciated that sensor data may be broadcast by the sensor itself, or be routed through another machine such as FIG. 1 coordinator 130 to manage communication between the mobile device and provide sensor data.

In one embodiment, if using a key timeout or other authentication expiration, a device 202 may receive data, e.g., from a TCP connection, but must periodically revalidate (see, e.g., operations 216, 218) and send it to the peer of that TCP connection (e.g., a sensor 206), or after a given timeout a sensor or other peer device will cut off the connection and ignore communication as discussed above. After credential revalidation, communication with a sensor or other cryptographically secured device may be reestablished. It will be appreciated that validating authorization to receive data may be separate from encrypting data shared with the device, and the data may be unencrypted, encrypted over the connection (SSL or TLS) between the device and a sensor(s), or encrypted using a never changing or intermittently changing key, e.g., weekly, monthly, etc.

In one embodiment, if using an expiring key, a device 202 may use TCP, a network broadcasting method, and/or some other technique to receive data. In this embodiment, devices that may connect to the network to receive data are not necessarily restricted, however, in this embodiment data must be encrypted. The encryption may be done by any desired cryptographic system, such as symmetric cryptography, e.g. Advanced Encryption Standard (AES). In one embodiment, encryption keys change regularly, e.g., every few minutes. For example, assume at time Tn, a sensor(s) is encrypting data with key Kn. In operation 218 above, the device will obtain a "current key" Kn for time Tn and a "next key" Kn+1 for time Tn+1 At time Tn+1, if the device it does not re-authenticate by repeating operation 214, the furthest data the device may decrypt will be at time Tn+1. When time Tn+2 is reached the device is out of date and can no longer decrypt messages from a sensor(s) that moved on at time Tn+2 to using the next key Kn+2. If the device desires continued access, it must perform operation 214 again to get access to current keys. Note that obtaining a current and next key is for convenience in avoiding potential gaps in time between operations 214, 218. In alternate embodiments, time gaps may be ignored and using 1 key will work.

Figure 3:
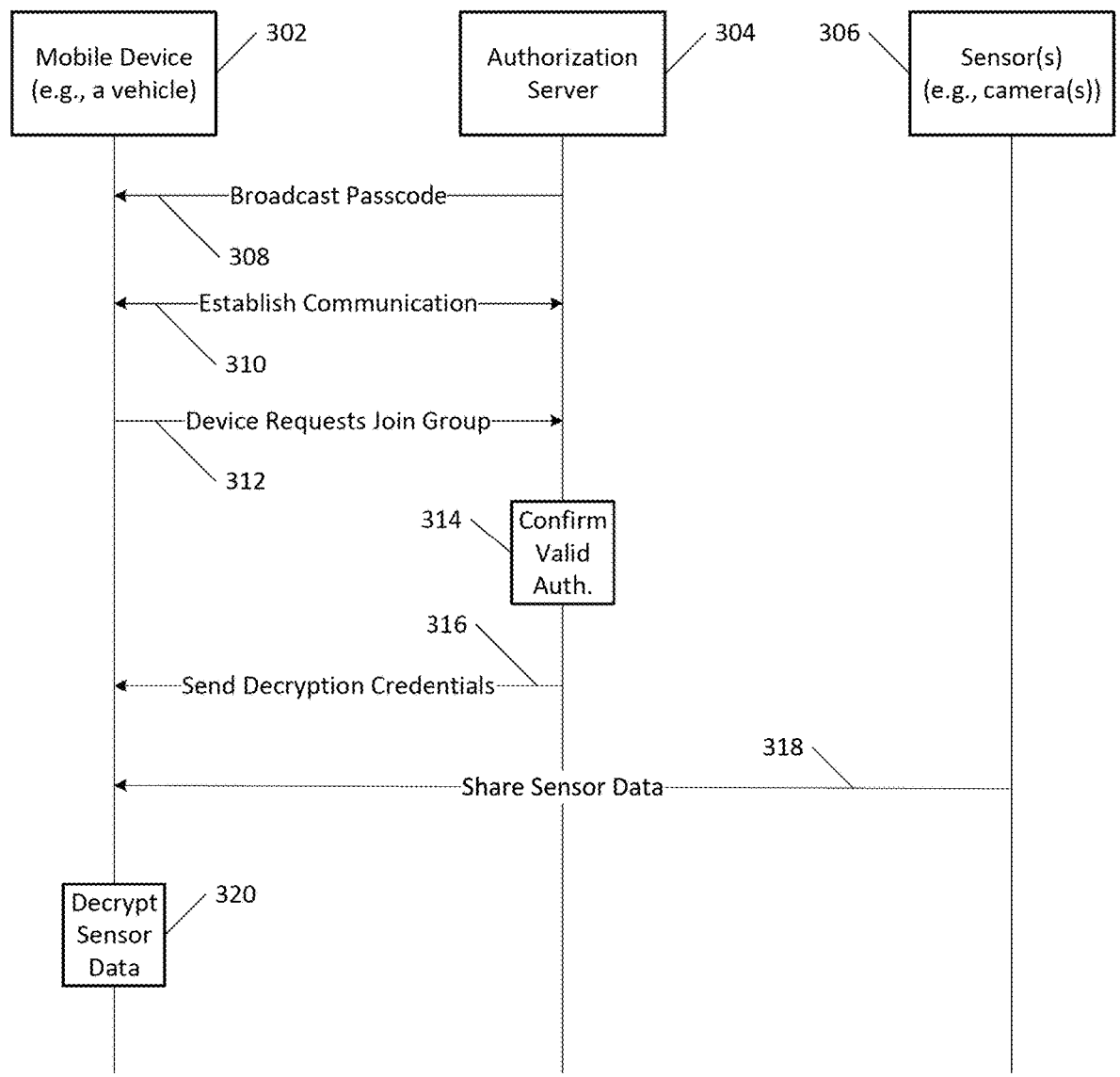
FIG. 3 illustrates an exemplary sequence diagram 300.

FIG. 3 illustrates an exemplary sequence diagram 300. In this embodiment, rather than a sensor(s) 306 looking for mobile device 302, e.g., by looking for license plates or other indicia identifying the mobile device, instead an authorization server 304 uses a short range communication technique to broadcast 308 a passcode to the mobile device. In one embodiment, the passcode may is an initial code, which may be rapidly changing, broadcast to all devices in range to bootstrap conversation with the mobile device. In one embodiment the mobile device may use this code to then establish 310 a more secure conversation with the authorization server. In another embodiment, the authentication server broadcasts a One Time Passcode (OTP) to the mobile device, which the device may later use to communicate with the authentication server and/or other devices associated with sensor data to be accessed.

In one embodiment, the authentication server (or a proxy or other associated machine) may use a short-range communication technique to ensure the mobile device is physically proximate to the authentication server 304 and/or the group and/or sensor(s) 306 to which the mobile device seeks to obtain sensor data. It will be appreciate there are many technologies that may be used for short-range communication, such as Ultra high frequency (UHF) broadcasts or other broadcast technologies, e.g., Bluetooth®, ZigBee®, Impulse Radio Ultra Wide Band (IR-UWB), Wi-Fi, EnOcean, Narrow Band Wi-SUN, etc. as well IEEE 802.15.4 technologies, such as low-rate wireless personal area networks (LR-WPANs).

In communicating with the authorization server, in one embodiment, a mobile device 302 may provide a certificate to validate it is a class of device entitled to receive data, such as sensor(s) 306 data, from the authorization server 304. It will be appreciated a certificate may be provided responsive to receiving the broadcast 308 passcode, and/or later when the mobile device attempts to access sensor data. In one embodiment, the certificate is in accord with the Intel® Enhanced Privacy ID (EPID) Security Technology (EPID certificate). (See, for example, Internet URL software.intel.com/en-us/articles/intel-enhanced-privacy-id-epid-security-technology.) The EPID certificate may previously be issued to the mobile device from an appropriate authority (e.g., a Certificate Authority (CA) root or the like) and associated with a particular EPID group, such as from an "automobile group". Having an EPID certificate from an automobile group would anonymously authenticate the mobile device to the authorization server as a legitimate member of a class of devices with which the authorization server is willing to provide sensor data. It will be appreciated EPID may be used in lieu of or in combination with other public and/or private key cryptosystems.

If the mobile device requests 312 to join the group, which for illustrative purposes is assumed made to the authorization server, but could be to a sensor 306 and/or other machine, the authorization server may confirm 314 the mobile device has valid authorization to access sensor data. Authorization may be based on the presenting the credentials initially short-range broadcast 308 to the mobile device, since for the mobile device to have the passcode or other credential that was short-range broadcast then the mobile device is known to be proximate to the desired sensor or sensor group and hence presumed authorized to receive the sensor data. Authorization may also be determined based on other information that may have been established 310 in subsequent communicating with the authorization server. In requesting to join the group, the mobile device may provide a certificate, such as the EPID certificate, if not previously presented, to establish the mobile device is of a class of devices allowed to receive the type of data from the sensor(s) 306.

After confirming 314 the mobile device, the authorization server 304 may send 316 to the mobile device 302 decryption credentials, such as a decryption key or other information needed to enable the mobile device to access sensor data provided by or by way of the sensor(s) 306. In the illustrated embodiment, a sensor shares 318 sensor data with the mobile device. However, it will be appreciated the mobile device may receive sensor data directly from a sensor, or by way of another machine such as the FIG. 1 coordinator 130, the authorization server, or other machine. The mobile device may then decrypt 320 and utilize received sensor data. As discussed with FIG. 1, for a mobile device that is or is disposed within a vehicle, the sensor data may include information to assist with identifying potentially dangerous situations, upcoming obstacles, etc. and potentially provide early opportunity to avoid trouble. In one embodiment, the decryption credentials that were sent 316, periodically expire. For example the decryption key for the sensor group may be updated regularly. If the mobile device still has a need to access the sensor data, it may initiate another join request 312.

Figure 4:
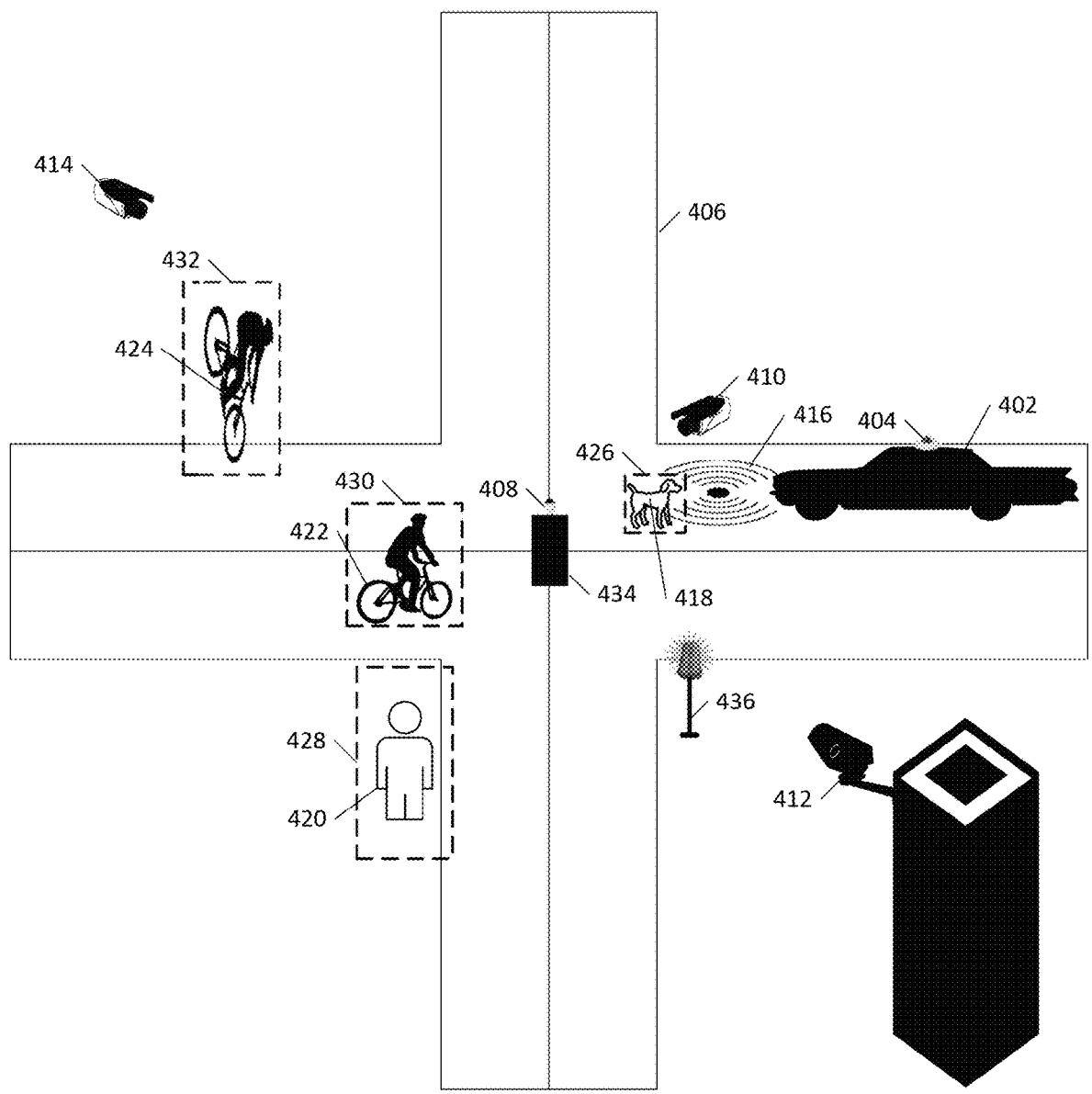
FIG. 4 illustrates an exemplary intersection environment 400.

FIG. 4 illustrates an exemplary intersection environment 400. As illustrated there is a vehicle 402 with various sensors, e.g., a camera 404 and other sensors (not specifically illustrated) to assist with autonomous or semi-autonomous driving on a road 406. As discussed above, in addition to cameras and other sensors built-in to the vehicle, the vehicle may make use of other sensors such as a camera 408 that may be located on a traffic signal in intersection, or as part of a photo radar camera 410 system, or a camera 412 that may be attached to a nearby building and having a view toward the road, or other camera(s) 414 that may be in the vicinity and able to be part of a group of cameras and other sensors. The sensors may also include non-visual sensors such as a motion detector 416 that may detect the presence and general characteristics of objects based on signal echo analysis, e.g., of electromagnetic, light, and/or sound based emissions, such used in RADAR, sonar, lidar, etc.

In one embodiment, sensors 408-416 analyze their sensor input in real or near real-time and apply algorithms to detect objects and/or other information revealed by the sensor input. Object detection and/or recognition, scene detection and/or analysis, motion detection and/or analysis, geometrical analysis, etc. may be used to identify obstacles and/or potentially dangerous situations (collectively "risks") that may affect operation of the vehicle 402. As discussed with respect to FIGS. 1-3, some of these risks may be identified by sensors 404 built into the vehicle. Thus, for example, the vehicle may directly detect an animal 418 that may have run into the road. But other risks, such as from a pedestrian 420, cyclist 422 on the road, or cyclist 424 that may suddenly cross the road beyond the intersection, these risks are unlikely to be detectable by sensors in the vehicle until the vehicle is closer to the risk. Given that there is often very limited time to respond to a risk, assistance from the sensors 408-416 external to the vehicle may allow the vehicle extra time and/or opportunity to identify a risk and respond to it.

Therefore, in one embodiment, sensors 408-416 are part of one or more groups with which the vehicle 402 authenticates as discussed above to receive sensor data about areas proximate to the vehicle. In one embodiment, each sensor 408-416 flags input deemed of interest, such as recognized objects (e.g., recognized animals, people, etc. 418-424). In the illustrated embodiment, recognized objects are outlined with a bounding box 426-432 (or cube if using 3D data) that is associated with a known scale so that the vehicle's AI or other controlling mechanism may receive the data and understand the size and relative location of a recognized object. Depending on the sensor the data may also include information about the object such as past motion, current motion, speed, trajectory, etc. Alternatively, a sequence of data from a sensor may provide position and size data and the vehicle (or the sensors) may determine motion aspects such as speed, direction, and possibility of collision through analysis of and comparison between different data frames. It will be appreciated that all data from sensors may have a timestamp or other associated data (e.g., from a common source, such as global positioning system (GPS), network, or other source) to allow sorting inputs at least by time to assist with priority analysis and data culling if newer data renders other data moot. For example, even if the camera 412 can detect the cyclist 422, data from camera 414 may be prioritized over data from camera 412 since camera 414 may be considered to have better (e.g., more relevant, more precise, etc.) data about cyclist 422 due to its better perspective.

In another embodiment, sensors 408-416 may provide their data to a server or other machine, machine collective, or distributed execution environment, such as the FIG. 1 coordinator 130. In this embodiment, rather than (or in addition to) the vehicle 402 receiving sensor data directly from the sensors, instead the coordinator or other machine(s) collect sensor data and provide it to the vehicle. In this embodiment, it will be appreciated the coordinator may be able to apply better detection algorithms and thus assist the vehicle in identifying and/or responding to risks. In one embodiment, the coordinator may also use sensor fusion to create virtual sensors out selected ones of the sensors to provide data not available from any specific sensor. For example, while one sensor may detect a specific object, such as vehicles on the road, sensor fusion incorporating inputs from cameras, acoustic receivers, etc. may be combined to assess traffic state. The state, if provided to a vehicle, may result in the vehicle adjusting its navigation to accommodate detected increasing traffic congestion.

In one embodiment, if a sensor 408-416 (or coordinator) detects a moving cyclist 422, it may send sensor data identifying, for example, a timestamp of the detection; the type of object detected, e.g., bicycle; the size of the object, e.g., width and height in a particular unit such as meters; it's position, which may be determined and provided as an absolute reference from a predetermined location, as a relative reference with respect to the sensor's position (which will be known or determinable), or relative to the position of the mobile device (e.g., the vehicle 402) requesting the sensor data; speed vector, e.g., speed in a particular unit such as km/h, and heading, where the heading may be determined and provided as an absolute reference from the predetermined location, as a relative reference with respect to the sensor's position, or relative to the position of the mobile device; and other data that the sensor may provide. That is, if a sensor detects objects with other object specific information of interest, it may include that as well. For example, if a camera detects another vehicle, it may provide the above timestamp, type, size, position and speed information, as well as vehicle specific information such as an identified license plate or other marker identifying the vehicle.

In one embodiment, if a sensor 408-416 (or coordinator) detects anomalous behavior, such as the signal light 434 being red or otherwise indicating cyclist 422 should stop for the signal, but it is detected the cyclist is not decelerating on approach to the intersection, the sensor may provide the above timestamp, type, size, position and speed information, as well as a warning component to indicate the cyclist may violate the traffic signal; the warning may allow the vehicle to prepare for the cyclist to perform what would otherwise be an unexpected entry into the intersection.

In one embodiment, if a sensor 408-416 (or coordinator) detects the trajectory of two objects are going to collide (where one object may be the vehicle), the sensor may provide a timestamp, and alert type, e.g., potential collision, and predicted time of collision, along with the type, size, position and speed information for each of the objects that appear to be at risk of colliding. It is assumed that if the two objects are vehicles, the AI for the two vehicles may, with the alert, slow down or otherwise take evasive action. It will be appreciated that some objects, such as the cyclists 422, 424 may not have receivers for the sensor data. In one embodiment, a device 436, such as a light and/or siren, or other warning device, may be used to emit light, noise or other output to alert of an impending problem. For example, a distracted cyclist 422 may see and/or hear the device 436, and become more cautious and attempt to identify and avoid a potentially dangerous situation.

It will be appreciated a coordinator may receive and process sensor data from sensors 408-416 and send data to mobile devices such as the vehicle 402. When receiving alerts from sensors and/or the coordinator, the vehicle may perform a variety of autonomous tasks to address and/or respond to the alert, and it may also notify (e.g., on a heads up display or other output) a driver of the alerts to allow the driver to determine what if any action the driver wishes to take in response to the alert.

Figure 5:
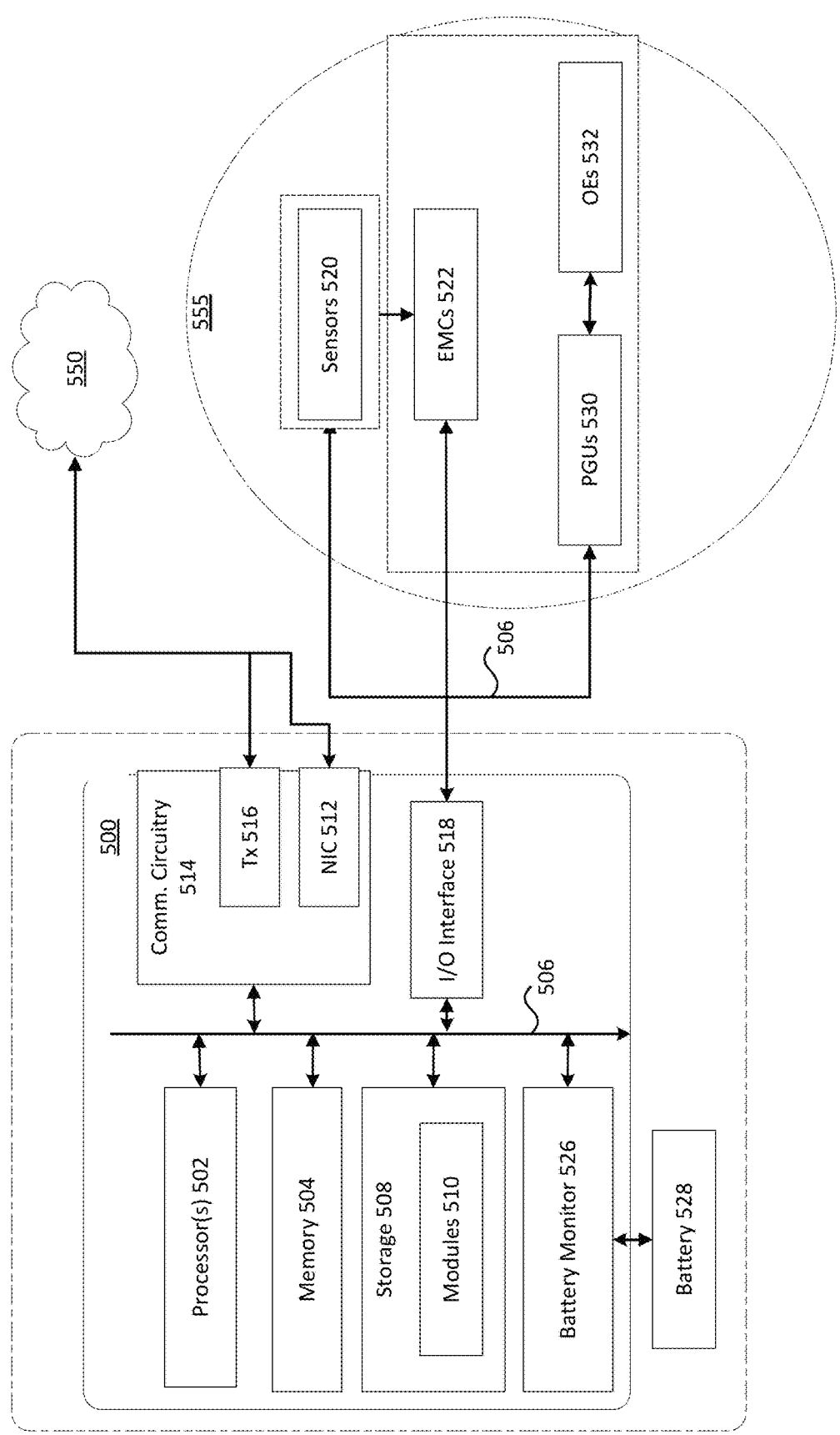
FIG. 5 illustrates an exemplary environment illustrating a computer device 500, in accordance with various embodiments.

FIG. 5 illustrates an exemplary environment illustrating a computer device 500, in accordance with various embodiments. The computer device 500 may include any combinations of the components and/or items shown and/or discussed with respect to FIG. 1 sensors 108-112, 128, coordinator 130, or vehicle 114 and associated sensors 116, 118 and/or FIG. 4 sensors 408-416 or vehicle 402 and associated sensor(s) 404. The components may be implemented as integrated circuits (ICs) or portions thereof, discrete electronic devices, or other modules, logic, hardware, software, firmware, middleware or a combination thereof adapted in the computer device, or as components otherwise incorporated within a chassis of a larger system.

The computer device 500 may be an embedded system or any other type of computer device discussed herein. In one example, the computer device may be employed in or as a device providing sensors and sensor data as discussed herein. In another example, the computer device may be an aggregator in communication with sensors sharing sensed data. The sensors and aggregators may be separate and dedicated and/or special-purpose computer device designed specifically to carry out embodiments discussed herein.

Processor(s) 502 (also referred to as "processor circuitry") may be one or more processing elements configured to perform basic arithmetical, logical, and input/output operations by carrying out instructions. Processor circuitry may be implemented as a standalone system/device/package or as part of an existing system/device/package of, for example, in FIG. 1 sensors 108-112, 128, coordinator 130, or vehicle 114 and associated sensors 116, 118 and/or FIG. 4 sensors 408-416 or vehicle 402 and associated sensor(s) 404. The processor circuitry may be one or more microprocessors, one or more single-core processors, one or more multi-core processors, one or more multithreaded processors, one or more GPUs, one or more ultra-low voltage processors, one or more embedded processors, one or more DSPs, one or more FPDs (hardware accelerators) such as FPGAs, structured ASICs, programmable SoCs (PSoCs), etc., and/or other processor or processing/controlling circuit. The processor circuitry may be a part of a system on a chip (SoC) in which the processor circuitry and other components discussed herein are formed into a single IC or a single package. As examples, the processor circuitry may include one or more Intel Pentium®, Core®, Xeon®, Atom®, or Core M® processor(s); Advanced Micro Devices (AMD) Accelerated Processing Units (APUs), Epyc®, or Ryzen® processors; Apple Inc. A series, S series, W series, etc. processor(s); Qualcomm Snapdragon® processor(s); Samsung Exynos® processor(s); and/or the like.

In embodiments, the processor circuitry 502 may include a sensor hub (not illustrated), which may act as a coprocessor by processing data obtained from the sensors 520. The sensor hub may include circuitry configured to integrate data obtained from each of the sensors by performing arithmetical, logical, and input/output operations. In embodiments, the sensor hub may capable of timestamping obtained sensor data, providing sensor data to the processor circuitry in response to a query for such data, buffering sensor data, continuously streaming sensor data to the processor circuitry including independent streams for each sensor, reporting sensor data based upon predefined thresholds or conditions/triggers, and/or other like data processing functions.

Memory 504 (also referred to as "memory circuitry" or the like) may be circuitry configured to store data or logic for operating the computer device 500. Memory circuitry may include number of memory devices may be used to provide for a given amount of system memory. As examples, the memory circuitry can be any suitable type, number and/or combination of volatile memory devices (e.g., random access memory (RAM), dynamic RAM (DRAM), static RAM (SAM), etc.) and/or non-volatile memory devices (e.g., read-only memory (ROM), erasable programmable read-only memory (EPROM), electrically erasable programmable read-only memory (EEPROM), flash memory, anti-fuses, etc.) that may be configured in any suitable implementation as are known. In one embodiment, memory, such as flash memory or other memory is or may include a memory device that is a block addressable memory device, such as those based on NAND or NOR technologies. A memory device may also include future generation nonvolatile devices, such as a three dimensional crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In various implementations, individual memory devices may be formed of any number of different package types, such as single die package (SDP), dual die package (DDP) or quad die package (Q17P), dual inline memory modules (DIMMs) such as microDIMMs or Mini-DIMMs, and/or any other like memory devices. To provide for persistent storage of information such as data, applications, operating systems and so forth, the memory circuitry may include one or more mass-storage devices, such as a solid state disk drive (SSDD); flash memory cards, such as SD cards, microSD cards, xD picture cards, and the like, and USB flash drives; on-die memory or registers associated with the processor circuitry 502 (for example, in low power implementations); a micro hard disk drive (HDD); three dimensional cross-point (3D XPOINT) memories from Intel® and Micron®, etc.

Where FPDs are used, the processor circuitry 502 and memory circuitry 504 (and/or device storage circuitry 508) may comprise logic blocks or logic fabric, memory cells, input/output (I/O) blocks, and other interconnected resources that may be programmed to perform various functions of the example embodiments discussed herein. The memory cells may be used to store data in lookup-tables (LUTs) that are used by the processor circuitry to implement various logic functions. The memory cells may include any combination of various levels of memory/storage including, but not limited to, EPROM, EEPROM, flash memory, SRAM, anti-fuses, etc.

Data storage circuitry 508 (also referred to as "storage circuitry" or the like), with shared or respective controllers, may provide for persistent storage of information such as modules 510, operating systems, etc. The storage circuitry may be implemented as solid state drives (SSDs); solid state disk drive (SSDD); serial AT attachment (SATA) storage devices (e.g., SATA SSDs); flash drives; flash memory cards, such as SD cards, microSD cards, xD picture cards, and the like, and USB flash drives; three-dimensional cross-point (3D Xpoint) memory devices; on-die memory or registers associated with the processor circuitry 502; hard disk drives (HDDs); micro HDDs; resistance change memories; phase change memories; holographic memories; or chemical memories; among others. As shown, the storage circuitry is included in the computer device 500; however, in other embodiments, storage circuitry may be implemented as one or more separate devices that are mounted in, for example, an aggregator 116 separate from the other elements of the computer device.

In some embodiments, the storage circuitry 508 may include an operating system (OS) (not shown), which may be a general purpose operating system or an operating system specifically written for and tailored to the computer device 500. The OS may include one or more drivers, libraries, and/or application programming interfaces (APIs), which provide program code and/or software components for modules 510 and/or control system configurations to control and/or obtain/process data from one or more sensors 520 and/or EMCs 522. The modules 510 may be software modules/components used to perform various functions of the computer device and/or to carry out functions of the example embodiments discussed herein. In embodiments where the processor circuitry 502 and memory circuitry 504 includes hardware accelerators (e.g., FPGA cells) as well as processor cores, the hardware accelerators (e.g., the FPGA cells) may be pre-configured (e.g., with appropriate bit streams, logic blocks/fabric, etc.) with the logic to perform some functions of the embodiments herein (in lieu of employment of programming instructions to be executed by the processor core(s)). For example, the modules may comprise logic for the corresponding entities discussed with regard to FIG. 1.

The components of computer device 500 and/or FIG. 1 sensors 108-112, 128, coordinator 130, or vehicle 114 and associated sensors 116, 118 and/or FIG. 4 sensors 408-416 or vehicle 402 and associated sensor(s) 404 may communicate internally or as the case may be, with one another, over the bus 506. The bus may include any number of technologies, such as a Local Interconnect Network (LIN); industry standard architecture (ISA); extended ISA (EISA); PCI; PCI extended (PCIx); PCIe; an Inter-Integrated Circuit (I2C) bus; a Parallel Small Computer System Interface (SPI) bus; Common Application Programming Interface (CAPI); point to point interfaces; a power bus; a proprietary bus, for example, Intel® Ultra Path Interface (UPI), Intel® Accelerator Link (IAL), or some other proprietary bus used in a SoC based interface; or any number of other technologies. In some embodiments, bus 506 may be a controller area network (CAN) bus system, a Time-Trigger Protocol (TTP) system, or a FlexRay system, which may allow various devices (e.g., sensors 520, EMCs 522, etc.) to communicate with one another using messages or frames. Communications circuitry 514 may include circuitry for communicating with a wireless network or wired network. For example, the communication circuitry may include transceiver (Tx) 216 and network interface controller (NIC) 212, and may include one or more processors (e.g., baseband processors, modems, etc.) dedicated to a particular wireless communication protocol.

NIC 212 may be included to provide a wired communication link to a network 550, e.g., the cloud, and/or other devices. Wired communication may provide an Ethernet connection, an Ethernet-over-USB, and/or the like, or may be based on other types of networks, such as DeviceNet, ControlNet, Data Highway+, PROFIBUS, or PROFINET, among many others. An additional NIC may be included to allow connection with a second network (not shown) or other devices, for example, a first NIC 512 providing communications to the network 550 over Ethernet, and a second MC providing communications to other devices over another type of network, such as a personal area network (PAN) including a personal computer (PC) device. In some embodiments, the various illustrated components, such as sensors 520, EMCs 522, PGUs 530, etc. may be connected to the system 500 via the NIC 512 as discussed above rather than via the I/O circuitry 518.

The Tx 516 may include one or more radios to wirelessly communicate with the network 550 and/or other devices. The Tx may include hardware devices that enable communication with wired networks and/or other devices using modulated electromagnetic radiation through a solid or non-solid medium. Such hardware devices may include switches, filters, amplifiers, antenna elements, and the like to facilitate the communications over the air (OTA) by generating or otherwise producing radio waves to transmit data to one or more other devices, and converting received signals into usable information, such as digital data, which may be provided to one or more other components of computer device 500. In some embodiments, the various components of the illustrated embodiment, such as sensors 520, EMCs 522, PGUs 530, etc. may be connected to the system 500 via the Tx as discussed above rather than via the I/O circuitry 518. In one example, one or more sensors 520 may be coupled with system 500 via a short range communication protocol, such as those discussed previously, e.g., BLE or the like. In another example, the PGUs may be coupled with the system via a wireless connection (e.g., via Tx 516 or the like) and operate in conjunction with one or more remote display protocols, such as the wireless gigabit alliance (WiGiG) protocol, the remote desktop protocol (RDP), PC-over-IP (PCoIP) protocol, the high-definition experience (HDX) protocol, and/or other like remote display protocols.

The Tx 516 may include one or multiple radios that are compatible with any number of 3GPP (Third Generation Partnership Project) specifications, notably Long Term Evolution (LTE), Long Term Evolution-Advanced (LTE-A), Long Term Evolution-Advanced Pro (LTE-A Pro), and Fifth Generation (5G) New Radio (NR). It can be noted that radios compatible with any number of other fixed, mobile, or satellite communication technologies and standards may be selected. These may include, for example, any Cellular Wide Area radio communication technology, which may include e.g. a 5G communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+(High Speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, =Wave standards in general (wireless systems operating at 10-90 GHz and above such as WiGig, IEEE 802.11ad, IEEE 802.11ay, and the like. In addition to the standards listed above, any number of satellite uplink technologies may be used for the uplink transceiver, including, for example, radios compliant with standards issued by the ITU (International Telecommunication Union), or the ETSI (European Telecommunications Standards Institute), among others.

Communication circuitry 514 may implement or support any number of standards, protocols, and/or technologies datacenters typically use, such as networking technology providing high-speed low latency communication. For example, the communication chip(s) may support RoCE (Remote Direct Memory Access (RDMA) over Converged Ethernet), e.g., version 1 or 2, which is a routable protocol having efficient data transfers across a network, and is discussed for example at Internet URL RDMAconsortium.com. The chip(s) may support Fibre Channel over Ethernet (FCoE), iWARP, or other high-speed communication technology, see for example the OpenFabrics Enterprise Distribution (OFED™) documentation available at Internet URL OpenFabrics.org. It will be appreciated datacenter environments benefit from highly efficient networks, storage connectivity and scalability, e.g., Storage Area Networks (SANs), parallel computing using RDMA, Internet Wide Area Remote Protocol (iWARP), InfiniBand Architecture (IBA), and other such technology. The examples provided herein are thus understood as being applicable to various other communication technologies, both existing and not yet formulated. Implementations, components, and details of the aforementioned protocols may be those known in the art and are omitted herein for the sake of brevity.

The input/output (I/O) interface 518 may include circuitry, such as an external expansion bus (e.g., Universal Serial Bus (USB), FireWire, Thunderbolt, PCI/PCIe/PCIx, etc.), used to connect computer device 500 with external components/devices, such as sensors 520, EMCs 522, PGUs 530, etc. I/O interface circuitry 518 may include any suitable interface controllers and connectors to interconnect one or more of the processor circuitry 502, memory circuitry 504, data storage circuitry 508, communication circuitry 514, and the other components of computer device 500. The interface controllers may include, but are not limited to, memory controllers, storage controllers (e.g., redundant array of independent disk (RAID) controllers, baseboard management controllers (BMCs), input/output controllers, host controllers, etc. The connectors may include, for example, busses (e.g., bus 506), ports, slots, jumpers, interconnect modules, receptacles, modular connectors, etc. The I/O circuitry 518 may couple the system 500 with sensors 520, EMCs 522, PGUs 530, etc. via a wired connection, such as using USB, FireWire, Thunderbolt, RCA, a video graphics array (VGA), a digital visual interface (DVI) and/or mini-DVI, a high-definition multimedia interface (HDMI), an S-Video, and/or the like. Although FIG. 5 shows that the sensors 520, EMCs 522, and PGUs 530 are coupled with the computer device 500 via interface circuitry 518, in other embodiments, the sensors, EMCs 522, and PGUs may be communicatively coupled with the computer device via Tx 516, using short-range radio links, WiFi signaling, or the like.

Sensors 520 may operate as discussed above with respect to FIGS. 1 and 4 sensors 108-112, 116, 118, 128, 404, 408-416 and be any device configured to detect events or environmental changes, convert the detected events into electrical signals and/or digital data, and transmit/send the signals/data to the computer device 500 and/or one or more EMCs 522. Some of the sensors 520 may be sensors used for providing computer-generated sensory inputs in an environment which may include computer device 500. Some of the sensors may be sensors used for motion and/or object detection. Examples of such sensors may include, inter alia, charged-coupled devices (CCD), Complementary metal-oxide-semiconductor (CMOS) active pixel sensors (APS), lens-less image capture devices/cameras, thermographic (infrared) cameras, Light Imaging Detection And Ranging (LIDAR) systems, and/or the like. In some implementations, the sensors may include a lens-less image capture mechanism comprising an array of aperture elements, wherein light passing through the array of aperture elements define the pixels of an image. In embodiments, the motion detection sensors may be coupled with or associated with light generating devices, for example, one or more infrared projectors to project a grid of infrared light onto a scene or environment, where an infrared camera may record reflected infrared light to compute depth information.

Some of the sensors 520 may be used for position and/or orientation detection, ambient/environmental condition detection, and the like. Examples of such sensors may include, inter alia, microelectromechanical systems (MEMS) with piezoelectric, piezoresistive and/or capacitive components, which may be used to determine environmental conditions or location information related to the computer device 500. In embodiments, the MEMS may include 3-axis accelerometers, 3-axis gyroscopes, and/or magnetometers. In some embodiments, the sensors may also include one or more gravimeters, altimeters, barometers, proximity sensors (e.g., infrared radiation detector(s) and the like), depth sensors, ambient light sensors, thermal sensors (thermometers), ultrasonic transceivers, and/or the like.

The EMCs 522 may be devices that allow computer device 500 to change a state, position, orientation, move, and/or control a mechanism or system. The EMCs may include one or more switches; haptic output devices, such as actuators and/or motors (e.g., eccentric rotating mass (ERM) actuators, linear resonant actuator (LRA), piezoelectric actuators, servomechanisms, rotary motors, linear motors, and step motors, etc.), thrusters, projectile ejecting devices (e.g., using spring loaded or compressed air/fluid), and/or the like. In embodiments, the EMCs may comprise speakers, a digital rendering module(s) (e.g., a physical object with a digital rendering module therein), and/or another way to control an acoustic energy emission, an electromagnetic radiation emission, an electric energy application, a magnetic field, and an acceleration or deceleration emitted or experienced by a physical object. In embodiments, computer device may be configured to operate one or more EMCs by transmitting/sending instructions or control signals to the EMCs based on detected user interactions or other like events.

Picture generation units (PGUs) 530 may generate light (e.g., based on digital images), which may be directed and/or redirected to optical elements (OEs) 532, e.g., to a display surface. The digital images may be any type of content stored by the storage circuitry 508, streamed from remote devices via the communication circuitry 514, and/or based on outputs from various sensors 520, EMCs 522, and/or other objects, or, as discussed in FIG. 4, with respect to the alerting device 436. The OE that combines the generated light with the external light may be referred to as a "combiner element". The PGUs 530 may be one or more electronic devices that create or generate digital images to be directed to OEs 532. The combiner element (as well as other OEs) may be a display surface, which may be fully or partially opaque or transparent, that mixes the digital images output by the projector/PGUs 530 with viewed real-world objects to facilitate augmented reality. In embodiments, the OEs 532 may be a holographic OE, and in some embodiments, the combiner element may be a hologram or holographic image (e.g., transmissive, reflective, etc.).

The battery 528 may power the computer device 500. In embodiments, the battery may be a lithium ion battery, a metal-air battery, such as a zinc-air battery, an aluminum-air battery, a lithium-air battery, a lithium polymer battery, and the like. The battery monitor 526 may be included in the computer device 500 to track/monitor various parameters of the battery, such as a state of charge (SoCh) of the battery, state of health (SoH), and the state of function (SoF) of the battery. The battery monitor may include a battery monitoring IC, which may communicate battery information to the processor circuitry 502 over the bus 506. The bus may allow components of computer device 500 to communicate with one another. The bus may include any number of technologies, such as a Local Interconnect Network (LIN); industry standard architecture (ISA); extended ISA (EISA); Peripheral Component Interconnect Express (PCI); PCI extended (PCIx); PCI express (PCIe); an Inter-Integrated Circuit (I2C) bus; a Parallel Small Computer System Interface (SPI) bus; point to point interfaces; a power bus; a proprietary bus, for example, used in a SoC based interface; or any number of other technologies. Suitable implementations and general functionality of such bus systems are known, and are readily implemented by persons having ordinary skill in the art.

While not shown, various other devices may be present within, or connected to, the computer device 500. For example, I/O devices, such as a display, a touchscreen, or keypad may be connected to the computer device 500 via bus 506 to accept input and display outputs. In another example, the computer device may include or be coupled with positioning circuitry configured to determine coordinates based on signals received from global navigation satellite system (GNSS) constellations, e.g., to derive GPS data. In another example, the communications circuitry 514 may include a Universal Integrated Circuit Card (UICC), embedded UICC (eUICC), and/or other elements/components that may be used to communicate over one or more wireless networks.

Figure 6:
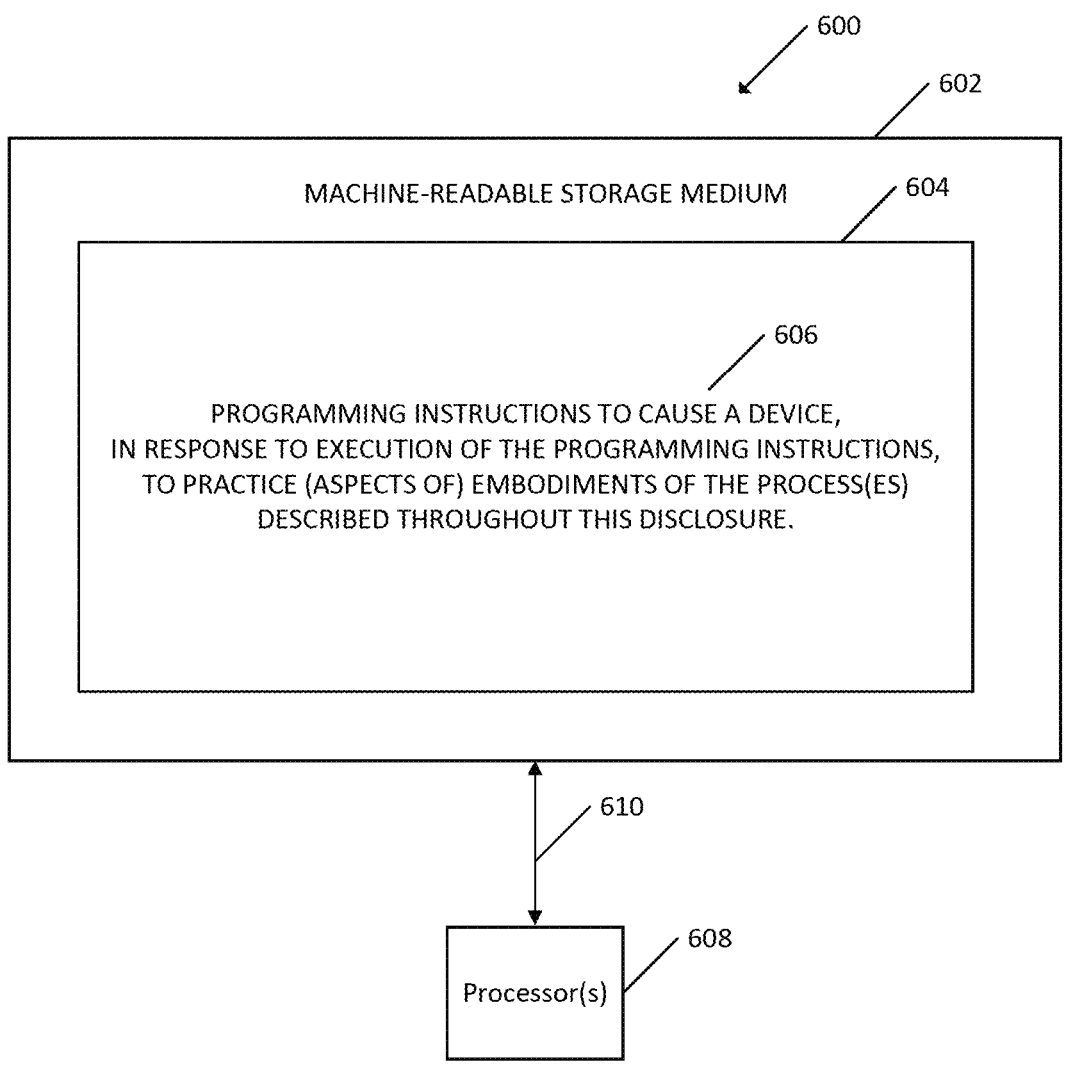
FIG. 6 illustrates an exemplary environment 600 illustrating a storage medium.

FIG. 6 illustrates an exemplary environment 600 illustrating a storage medium that may be transitory, non-transitory or a combination of transitory and non-transitory media, and the medium may be suitable for use to store instructions that cause an apparatus, machine or other device, in response to execution of the instructions, to practice selected aspects of the present disclosure. As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects. Furthermore, the present disclosure may take the form of a computer program product embodied in any tangible or non-transitory medium of expression having computer-usable program code embodied in the medium.

In one embodiment, the storage medium is a non-transitory, machine readable (or machine accessible) medium (NTMRM) 602 including associated information 604 that includes at least instructions 606 to direct one or more processor 608 to perform various functions delineated by the embodiments discussed herein. In embodiments, the non-transitory, machine readable medium 602 may be implemented in FIG. 1 sensors 108-112, 128, coordinator 130, or vehicle 114 and associated sensors 116, 118 and/or FIG. 4 sensors 408-416 or vehicle 402 and associated sensor(s) 404. The processor may access the non-transitory, machine readable medium 602 over a bus 610. The processor and bus may be the same or similar as described with respect to the processor 502 and bus 506 of FIG. 5. The non-transitory, machine readable medium may include devices described for the mass storage 508 of FIG. 5 or may include optical disks, thumb drives, or any number of other hardware devices or environments providing access to information. In some embodiments, the machine readable medium may be transitory, e.g., signals. In one embodiment the machine readable medium is non-transitory, then moved to a transitory state, which may then be moved back to a non-transitory state.

The NTMRM 602 may include code to direct the processor 608 to obtain data from any of FIGS. 1, 2, 4 sensors 108-112, 116, 118, 128, 220, 404, 408-416. The sensor data may be representative of a physical environment. In one embodiment, a modeling engine may direct the processor 608 to generate a model of the physical environment based at least in part on the sensor data. It will be appreciated the model need not be a visual-based model, and may just be various sensor input associated with positional data in any known spatial location system, e.g., longitude/latitude/altitude, 3-point (e.g., XYZ) positions, GPS (Global Positioning System) coordinates, triangulation based on communication towers, association with devices having a known location (e.g., printers, routers and other devices may have a known location that may be imputed to a device passing in range of it), etc. The model may be a suitable collection of data points in the multi-dimensional space connected by various geometric shapes or entities and may include textual and/or contextual information for various surfaces and/or locations within the environment. The model may be generated using any suitable modeling techniques/technologies.

The NTMRM may include code to receive and process user input and/or data associated with an analysis engine to direct the processor to perform some action, such as obtain data from any of FIGS. 1, 2, 4 sensors 108-112, 116, 118, 128, 220, 404, 408-416, interpret user interactions such as gestures and/or speech and/or other motion/movement, interact with other hardware, etc. In some embodiments, sensor and/or other data processed by the processor may include sensor data obtained from wearable technology which may be used to augment or supplement sensor data. In some embodiments, the NTMRM may include code to direct an aggregator to receive and evaluate sensor data and to instantiate virtual sensors and/or derive new virtual sensors based on received sensor data, and to recognize and respond to emergency situations.

The NTMRM may include code of a semantic engine (not illustrated) to direct the processor 602 to determine one or more semantic attributes, which may be used to influence operation of devices executing the code. The semantic engine may determine aspects such as user activity, user attributes, semantic location, social circumstances, ambient or environmental conditions, presence of electronic devices, schedules, communication, etc. that may allow determining what are desirable actions in a given circumstance. User activity semantics may include any information related to user, such as body (or body part) positions or orientations. User attributes may include any information related to user or user preferences.

It will be appreciated any combination of machine readable medium may be utilized, including, for example, but not limited to, an electronic, magnetic, optical, electromagnetic, infrared, or semiconductor system, apparatus, device, or propagation medium. More specific examples (a non-exhaustive list) of the machine readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or machine readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this disclosure, a computer-usable or machine readable medium may be any medium that can contain, store, communicate, propagate, or transport the program for use by or in connection with the instruction execution system, apparatus, or device. The machine readable medium may include a propagated data signal with the computer-usable program code embodied therewith, either in baseband or as part of a carrier wave. Program code may be transmitted using any appropriate wired or wireless medium, including wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Cooperative program execution may be for a fee based on a commercial transaction, such as a negotiated rate (offer/accept) arrangement, established and/or customary rates, and may include micropayments between device(s) cooperatively executing the program or storing and/or managing associated data. The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by program instructions. Program instructions may be provided to a processor of a general purpose computer, special purpose computer, or other programmable data processing apparatus to produce a machine, such that the instructions, which execute via the processor of the machine, computer, or other programmable data processing apparatus, to provide for implementing the functions/acts specified in the flowchart and/or block diagram block or blocks.

These program instructions may also be stored in a machine readable medium that can direct a machine, computer or other programmable data processing apparatus to function in a particular manner, such that the instructions stored in the machine readable medium produce an article of manufacture to provide a means to implement the function/act specified in the flowchart and/or block diagram block or blocks. The program instructions may also be loaded onto a machine, computer or other programmable data processing apparatus to cause a series of operational steps to be performed on the machine, computer or other programmable apparatus to produce a machine implemented process such that the instructions which execute on the computer or other programmable apparatus provide processes for implementing the functions/acts specified in the flowchart and/or block diagram block or blocks.

Example 1 may be a system including a first detector having a first location and including a first visual input for a first area, a second detector having a second location and including a second visual input of a second area that may at least temporarily include the first detector at the first location, and an obstacle, the system comprising: a first location device to determine the first location; a second location device to determine the second location; a location comparator to at least determine the first location is proximate to the second location; a communication service to at least establish communication between the first detector and the second detector at least while the first detector is proximate to the second detector; and a recognition system to detect obstacles in the second area that may be undetectable in the first area, and to provide an identification of the obstacle with the communication service.

Example 2 may be example 1, wherein the recognition system is associated with the second detector, and an identification of the obstacle is provided to the first detector from the second detector.

Example 3 may be example 2, wherein the obstacle is undetectable in the first visual input.

Example 4 may be any of examples 1-3, wherein the communication service is associated with the first detector and to contact a second communication service associated with the second detector while the detectors are proximate.

Example 5 may be any of examples 1-4, wherein the communication service is associated with the second detector and to initiate communicate with the first detector while the detectors are proximate.

Example 6 may be any of examples 1-5, further comprising: an authentication agent associated with the communication service to authenticate proximity of the first detector to the second detector; wherein the authentication agent is associated with selected ones of the first detector, the second detector, or a third-party authentication service.

Example 7 may be a method for determining whether to adjust movement of a first device with respect to an obstacle based in part on data received from a second device, the first device having a first location and a first input data corresponding to a dynamic area associated with the first device, and the second device having a second location and a second input data corresponding to a second area proximate to the second device, the method comprising: determining a proximity of the first device and the second device; negotiating a communication session between the first device and the second device; identifying the obstacle is in the second area but not in the dynamic area; exchanging between the first and the second device, during the proximity, data identifying the obstacle; determining whether to adjust movement of the first device based at least in part on the data identifying the obstacle.

Example 8 may be example 7, further comprising the first device receiving the data from the second device, and performing the determining whether to adjust movement based at least in part on the data.

Example 9 may be any of examples 7-8, further comprising the second device performing at least in part the determining whether to adjust movement of the first device, and communicating an adjustment recommendation to the first device.

Example 10 may be any of examples 7-9, wherein the first device is a mobile device, and the second device is a fixed-position device.

Example 11 may be example 10, wherein: the dynamic area represents a first viewpoint for the first device different from a second viewpoint for the second device; and the obstruction is at least temporarily detectable from the second viewpoint and undetectable from the first viewpoint.

Example 12 may be example 11, wherein the first input data corresponds to a first visual input, and the second input data corresponds to a second visual input.

Example 13 may be any of examples 7-12, further comprising: determining the first device has a potential collision with the obstacle; associating the potential collision with the data identifying the obstacle.

Example 14 may be any of examples 7-13, in which the determining the proximity comprises recognizing an identifying characteristic of the first device being within the second area.

Example 15 may be examples 14, wherein the second device has an associated recognition system, and the identifying characteristic is one or more of: a physical marker on the first device, or, a short-range wirelessly-detectable identifier.

Example 16 may be any of examples 7-15, further comprising: an authentication agent to encrypt the communication session with a key valid during at least a portion of the proximity of the first device and the second device; wherein the authentication agent is associated with selected ones of the first detector, the second detector, or a third-party authentication service.

Example 17 may be any of examples 7-16, wherein the first device: negotiates the communication session after the proximity with the second device; identifies the obstacle is in the second area but not in the dynamic area based at least in part on the data identifying the obstacle; and adjusts movement to avoid the obstacle.

Example 18 may be one or more non-transitory computer-readable media associated with an environment including a first detector having a first location and including a first visual input for a first area, a second detector having a second location and including a second visual input of a second area that may at least temporarily include the first detector at the first location, and an obstacle, the media having instructions to provide for: a first location device to determine the first location; a second location device to determine the second location; a location comparator to at least determine the first location is proximate to the second location; a communication service to at least establish communication between the first detector and the second detector at least while the first detector is proximate to the second detector; and a recognition system to detect obstacles in the second area that may be undetectable in the first area, and to provide an identification of the obstacle with the communication service.

Example 19 may be example 18, in which the recognition system is associated with the second detector, and the media further comprising instructions to perform an identification of the obstacle to be provided to the first detector from the second detector.

Example 20 may be one or more machine accessible media having instructions to provide for determining whether to adjust movement of a first device with respect to an obstacle based in part on data received from a second device, the first device having a first location and a first input data corresponding to a dynamic area associated with the first device, and the second device having a second location and a second input data corresponding to a second area proximate to the second device, the instructions, when accessed, result in: determining a proximity of the first device and the second device; negotiating a communication session between the first device and the second device; identifying the obstacle is in the second area but not in the dynamic area; exchanging between the first and the second device, during the proximity, data identifying the obstacle; determining whether to adjust movement of the first device based at least in part on the data identifying the obstacle.

Example 21 may be example 20 further comprising instructions to perform: the first device receiving the data from the second device; and performing the determining whether to adjust movement based at least in part on the data.

Example 22 may be any of examples 20-21 further comprising instructions to perform: the second device performing at least in part the determining whether to adjust movement of the first device; and communicating an adjustment recommendation to the first device.

Example 23 may be any of examples 20-22, further comprising instructions to perform: determining the first device has a potential collision with the obstacle;

associating the potential collision with the data identifying the obstacle.

Example 24 may be any of examples 20-23 further comprising instructions to perform: an authentication agent to encrypt the communication session with a key valid during at least a portion of the proximity of the first device and the second device; wherein the authentication agent is associated with selected ones of the first detector, the second detector, or a third-party authentication service.

Example 25 may be any of examples 20-24 further comprising instructions for access by at least the first device, the instructions to perform: negotiating the communication session after the proximity with the second device; identify the obstacle is in the second area but not in the dynamic area based at least in part on the data identifying the obstacle; and adjust movement to avoid the obstacle.

Example 26 may be means for performing any of examples 1-25.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A mobile device, comprising:
   sensor circuitry disposed on or in the mobile device, wherein the sensor circuitry is to monitor a first area;
   communication circuitry to establish communication between the mobile device and a group of external sensors at least while the mobile device is proximate to at least one external sensor in the group of external sensors; and
   processor circuitry connected to the sensor circuitry, wherein the processor circuitry is to:
      cause the communication circuitry to establish the communication between the mobile device and the group of external sensors when the mobile device is determined to be proximate to the at least one external sensor,
      receive, from individual external sensors in the group of external sensors via the communication circuitry, information about a second area that at least temporarily includes the mobile device and encompasses at least a portion of the first area,
      detect an object in the second area that may be undetectable in the first area based on the received information, and
      provide an identification of the detected object to the group of external sensors.

2. The mobile device of claim 1, wherein the received information includes information about the detected object, and the processor circuitry is to:
   generate a first instance of a model of the first area based on sensor data generated by the sensor circuitry; and
   generate a second instance of the model incorporating the detected object into the first instance of the model based on the information about the detected object.

3. The mobile device of claim 2, wherein the processor circuitry is to:
   control one or more components of the mobile device based on the second instance of the model.

4. The mobile device of claim 2, wherein the information about the detected object includes a timestamp, an object type of the detected object, a size of the detected object, a position of the detected object, and speed information related to the detected object.

5. The mobile device of claim 1, wherein the communication circuitry is to establish a direct communication with the external sensor using a short-range radio access technology; or the communication circuitry is to establish a communication session with the external sensor through a mobile communication network.

6. The mobile device of claim 1, wherein the processor circuitry is to:
   authenticate proximity of the mobile device to the at least one external sensor, wherein the authentication is based on detection of the first mobile device by the at least one external sensor.

7. A method for determining whether to adjust movement of a mobile device with respect to an obstacle, the method comprising:
   monitoring, by the mobile device, a first area using sensor circuitry disposed on or in the mobile device;
   negotiating, by the mobile device, a communication session between the mobile device and a group of external sensors when the mobile device is determined to be proximate to at least one external sensor in the group of external sensors;
   receiving, by the mobile device from individual external sensors in the group of external sensors during the communication session, information about a second area that at least temporarily includes the mobile device and encompasses at least a portion of the first area;
   identifying, by the mobile device, an object in the second area that may be undetectable in the first area based on the received information;
   exchanging data identifying the object between the mobile device and the group of external sensors during the communication session; and
   determining, by the mobile device, whether to adjust movement of the mobile device based at least in part on the data identifying the object.

8. The method of claim 7, further comprising:
   receiving, by the mobile device, the data from the at least one external sensor; and
   performing the determining whether to adjust movement based at least in part on the data.

9. The method of claim 7, further comprising: receiving, by the mobile device from the at least one external sensor, an adjustment recommendation for adjusting the movement of the mobile device.

10. The method of claim 7, wherein the mobile device is a smartphone, a tablet, a wearable device, or an autonomous vehicle, and the at least one external sensor is a fixed-position device.

11. The method of claim 10, wherein:
    the first area represents a first viewpoint for the mobile device different from a second viewpoint for the at least one external sensor; and
    the object is at least temporarily detectable from the second viewpoint and undetectable from the first viewpoint.

12. The method of claim 7, further comprising:
    determining, by the mobile device, that the mobile device has a potential collision with the object; and
    associating, by the mobile device, the potential collision with the data identifying the object.

13. The method of claim 7, wherein the mobile device is determined to be proximate to the at least one external sensor based on recognition of a characteristic of the mobile device being within the second area.

14. The method of claim 13, wherein the characteristic is one or more of: a physical marker on the mobile device or a short-range wirelessly-detectable identifier.

15. The method of claim 7, further comprising:
    encrypting the communication session with a key that is valid while the mobile device and the at least one external sensor are proximate to one another.

16. The method of claim 7, further comprising:
    negotiating, by the mobile device, the communication session after the mobile device is proximate with the at least one external sensor;
    identifying, by the mobile device, the object in the second area but not in the first area based at least in part on the data identifying the object; and
    adjusting the movement to avoid the object.

17. One or more non-transitory computer-readable media comprising instructions to operate an external sensor in a group of external sensors, wherein execution of the instructions by one or more processors is to cause the external sensor to:

monitor a portion of a second area that at least temporarily includes a mobile device and encompasses at least a portion of a first area monitored by the mobile device;

establish communication with the mobile device on behalf of the group of external sensors at least while the mobile device is proximate to the external sensor;

send information about the monitored portion of the second area to the mobile device for detection of an object in the second area that may be undetectable in the first area; and receive an identification of the detected object from the mobile device based on the sent information.

18. The media of claim 17, wherein execution of the instructions is to cause the external sensor to: determine an adjustment recommendation for adjusting movement of the mobile device based on the detected object; and send the adjustment recommendation to the mobile device.

19. One or more non-transitory machine accessible media comprising instructions, wherein execution of the instructions by a mobile device is to cause the mobile device to:

monitor a first area using sensor circuitry disposed on or in the mobile device;

negotiating a communication session between the mobile device and a group of external sensors when the mobile device is determined to be proximate to at least one external sensor in the group of external sensors;

receive, from individual external sensors in the group of external sensors during the communication session, information about a second area that at least temporarily includes the mobile device and encompasses at least a portion of the first area;

detect an object in the second area that may be undetectable in the first area based on the received information;

exchange data identifying the object between the mobile device and the at least one external sensor, during the communication session; and determine whether to adjust movement of the mobile device based at least in part on the data identifying the object.

20. The media of claim 19, wherein execution of the instructions is to cause the mobile device to:

receive the data from the at least one external sensor; and determine whether to adjust movement based at least in part on the received data.

21. The media of claim 19, wherein execution of the instructions is to cause the mobile device to: receive, from the at least one external sensor, an adjustment recommendation for the adjustment of the movement.

22. The media of claim 19, wherein execution of the instructions is to cause the mobile device to: determine a potential collision with the object; and associate the potential collision with the data identifying the object.

23. The media of claim 19, wherein execution of the instructions is to cause the mobile device to: encrypt the communication session with a key valid during at least a portion of a time while the mobile device is proximate to the at least one external sensor.

24. The media of claim 19, wherein execution of the instructions is to cause the mobile device to:

negotiate the communication session after the mobile device is proximate to the at least one external sensor;

identify the object is in the second area but not in the first area based at least in part on the data identifying the object; and cause the movement adjustment to avoid the object.

* * * * *

UNITED STATES PATENT AND TRADEMARK OFFICE
CERTIFICATE OF CORRECTION

PATENT NO. : 11,769,402 B2
APPLICATION NO. : 16/954481
DATED : September 26, 2023
INVENTOR(S) : Lejun Zhu It is certified that error appears in the above-identified patent and that said Letters Patent is hereby corrected as shown below:

In the Claims

Column 27
Line 26, Claim 19 "negotiating..." should read "negotiate..."

Signed and Sealed this
Twenty-first Day of November, 2023

Katherine Kelly Vidal
*Director of the United States Patent and Trademark Office*